(12) United States Patent
Dogimont et al.

(10) Patent No.: US 9,365,447 B2
(45) Date of Patent: Jun. 14, 2016

(54) SHEET OF GLASS WITH HIGH ENERGY TRANSMISSION (71) Applicant: AGC GLASS EUROPE, Louvain-la-Neuve (BE)

(72) Inventors: Audrey Dogimont, Woluwe-Saint-Pierre (BE); Sebastien Hennecker, Nivelles (BE); Thomas Lambricht, Louvain-la-Neuve (BE)

(73) Assignee: AGC GLASS EUROPE, Louvain-la-Neuve (BE)

( * ) Notice: Subject to any disclaimer, the term of this patent is extended or adjusted under 35 U.S.C. 154(b) by 0 days.

(21) Appl. No.: 14/386,438

(22) PCT Filed: Apr. 3, 2013

(86) PCT No.: PCT/EP2013/056989
§ 371 (c)(1),
(2) Date: Sep. 19, 2014

(87) PCT Pub. No.: WO2013/150053
PCT Pub. Date: Oct. 10, 2013

(65) Prior Publication Data
US 2015/0072156 A1    Mar. 12, 2015

(30) Foreign Application Priority Data
Apr. 4, 2012    (BE) .................................. 2012/0233

(51) Int. Cl.
*B32B 17/00*    (2006.01)
*B32B 15/00*    (2006.01)
(Continued)

(52) U.S. Cl.
CPC ............... *C03C 3/087* (2013.01); *C03C 4/0092* (2013.01); *C03C 17/06* (2013.01); *C03C 17/23* (2013.01); *C03C 2204/00* (2013.01); *C03C 2217/70* (2013.01); *C03C 2217/948* (2013.01)

(58) Field of Classification Search
USPC ......... 428/426, 428, 432, 688, 689, 697, 699, 428/701, 702
See application file for complete search history.

(56) References Cited

U.S. PATENT DOCUMENTS

| 3,351,474 A | 11/1967 | Hagedorn et al. |
| 2004/0229744 A1* | 11/2004 | Heithoff .......................... 501/72 |

(Continued)

OTHER PUBLICATIONS

International Search Report issued Jun. 21, 2013, in PCT/EP2013/056989, filed Apr. 3, 2013.

(Continued)

*Primary Examiner* — Lauren R Colgan
(74) *Attorney, Agent, or Firm* — Oblon, McClelland, Maier & Neustadt, L.L.P (57) ABSTRACT

The invention concerns an ultra-clear glass sheet, i.e. a sheet of glass with high energy transmission, that can be used, in particular, in the solar and architectural fields. More specifically, the invention concerns a sheet of glass having a composition which comprises, in an amount expressed as percentages of the total weight of the glass: $SiO_2$ 60-78%; $Al_2O_3$ 0-10%; $B_2O_3$ 0-5%; CaO 0-15%; MgO 0-10%; $Na_2O$ 5-20%; $K_2O$ 0-10%; BaO 0-5%; total iron (expressed in the form of $Fe_2O_3$) 0.002-0.03%, the composition comprises a copper content of 0.001 to 0.15% by weight relative to the total weight of the glass, the copper content being expressed in the form of Cu as a percentage by weight relative to the total weight of the glass.

14 Claims, 3 Drawing Sheets

(51) Int. Cl.
*C03C 3/087* (2006.01)
*C03C 4/00* (2006.01)
*C03C 17/06* (2006.01)
*C03C 17/23* (2006.01)

(56) References Cited

U.S. PATENT DOCUMENTS

| | | | |
|---|---|---|---|
| 2005/0170944 A1* | 8/2005 | Arbab et al. | 501/64 |
| 2006/0169316 A1* | 8/2006 | Thomsen et al. | 136/251 |
| 2007/0015654 A1 | 1/2007 | Scheffler-Hudlet et al. | |
| 2007/0099788 A1* | 5/2007 | Shelestak et al. | 501/64 |
| 2007/0116966 A1* | 5/2007 | Mellott et al. | 428/432 |
| 2007/0161492 A1* | 7/2007 | Smith et al. | 501/64 |
| 2008/0072956 A1* | 3/2008 | Sharma et al. | 136/256 |
| 2008/0085827 A1* | 4/2008 | Thomsen et al. | 501/60 |
| 2010/0297415 A1 | 11/2010 | Cid-Aguilar et al. | |
| 2011/0073182 A1* | 3/2011 | Taylor et al. | 136/259 |
| 2014/0147679 A1 | 5/2014 | Dogimont et al. | |
| 2014/0326314 A1 | 11/2014 | Dogimont et al. | |

OTHER PUBLICATIONS

U.S. Appl. No. 14/771,390, filed Aug. 28, 2015, Lambricht, et al.
U.S. Appl. No. 14/773,551, filed Sep. 8, 2015, Lambricht, et al.
U.S. Appl. No. 14/773,489, filed Sep. 8, 2015, Lambricht, et al.
U.S. Appl. No. 14/768,614, filed Aug. 18, 2015, Lambricht, et al.

* cited by examiner

SHEET OF GLASS WITH HIGH ENERGY TRANSMISSION

1. FIELD OF THE INVENTION

The field of the invention is that of glasses with high energy transmission, usable notably in photovoltaic modules or solar mirrors. The invention also relates to glasses with high light transmission, usable in the architectural field.

2. SOLUTIONS FROM THE PRIOR ART

In the solar energy field, where glass is used as a substrate for solar mirrors or for covering photovoltaic cells, it is of course extremely advantageous for the glass used, through which the radiation from the sun has to pass, to have very high transmission of visible light and/or energy. The efficiency of a solar cell is in fact significantly improved by even a very slight increase in this transmission. In particular, energy transmission above 89%, preferably above 90% or even above 91% is highly desirable.

To quantify the transmission of glass in the range including the visible and the solar infrared (or near infrared) as well as part of the ultraviolet, an energy transmission (ET) is defined, measured according to standard ISO9050 between the wavelengths of 300 and 2500 nm. In the present description and in the claims, energy transmission is measured according to this standard and is given for a thickness of 3.85 mm.

To quantify the transmission of glass in the visible range, light transmission (LT) is defined, calculated between the wavelengths of 380 and 780 nm according to standard ISO9050, and measured with the illuminant D65 (LTD) as defined by standard ISO/CIE 10526 assuming the colorimetric reference observer CIE 1931 as defined by standard ISO/CIE 10527.

To quantify the color of glass in the visible, a dominant wavelength (DWL) is defined. The latter is based on a CIE document: "Colorimetry, Official Recommendations of the CIE" (May 1970) which allows the color to be positioned on a trichromatic diagram CIE 1931. The illuminant C, 2° is used for defining the color. In the present description and in the claims, the dominant wavelength is expressed in nanometers (nm) for a thickness of 5 mm and is calculated on the basis of the internal specific spectral transmission, which is governed solely by the absorption of the glass and can be expressed by the Beer-Lambert law.

In the present description and in the claims, the dominant wavelength is expressed for a thickness of 5 mm and is calculated on the basis of the internal specific spectral transmission.

In the present description and in the claims, light transmission is measured according to this standard and is given for a thickness of 4 mm at a solid angle of observation of 2°.

To obtain values of LT and/or ET above 89% or even above 90%, it is known from the prior art to decrease the total iron content of the glass (expressed in terms of $Fe_2O_3$ according to the standard practice in this field). The so-called "clear" or "extraclear" soda-lime glasses always contain iron, as the latter is present as an impurity in most of the raw materials used (sand, limestone, dolomite, etc.). Iron exists in the structure of glass in the form of ferric ions $Fe^{3+}$ and ferrous ions $Fe^{2+}$. The presence of ferric ions $Fe^{3+}$ endows the glass with slight absorption of visible light of small wavelength and a stronger absorption in the near ultraviolet (absorption band centered on 380 nm), whereas the presence of ferrous ions $Fe^{2+}$ (sometimes expressed as oxide FeO) causes strong absorption in the near infrared (absorption band centered on 1050 nm). Ferric ions $Fe^{3+}$ give the glass a slight yellow coloration whereas ferrous ions $Fe^{2+}$ give a pronounced blue-green coloration. Thus, increasing the total iron content (in both its forms) accentuates the absorption in the visible and the infrared, to the detriment of light transmission and energy transmission. Moreover, a high concentration of ferrous ions $Fe^{2+}$ leads to a decrease in energy transmission and light transmission. Thus, it is also known, for further increasing the energy transmission and light transmission of glass, to oxidize the iron present in the glass, i.e. to decrease the content of ferrous ions to the benefit of the content of ferric ions, which absorb less. The oxidation level of a glass is given by its redox, defined as the weight ratio of $Fe^{2+}$ atoms relative to the total weight of the iron atoms present in the glass, $Fe^{2+}/Fe$ total.

Several solutions have been proposed for decreasing the redox of glass.

It is for example known from U.S. Pat. No. 7,482,294 to add cerium oxide ($CeO_2$) to glass. However, this is very expensive, it may generate an undesirable coloration of the glass but especially it is the cause of the phenomenon called "solarization" in which the energy transmission of glass decreases very considerably over time owing to exposure to the ultraviolet radiation present notably in the sun's rays.

It is also known to add antimony oxides to glass, which are capable of oxidizing the iron contained in the glass. However, it is known that antimony is not compatible with the method of forming glass by the float process. Moreover, its price and the amounts required for good oxidation of the glass make its use extremely expensive for solar applications.

Therefore at present there is no acceptable solution for decreasing the redox of an "extraclear" glass (low iron content) in order to increase its energy transmission and light transmission. There is therefore a real need for a technical solution for increasing the energy transmission (product with high added value) or decreasing the redox, and therefore the impact of the iron, while maintaining high energy transmission and thus lowering the costs of manufacture of such a glass notably by using raw materials that are less pure and less expensive.

Moreover, "extraclear" glass is also used in the architectural field. It is then used for example as substrate for decorative glasses suitable for interior (or exterior) design and for furnishing or again for coated glasses such as low-emissivity, self-cleaning, anticondensation or antireflective coatings, for example. It does not then need to have very high energy transmission, but it is of course extremely advantageous for the glass used in the architectural field to be extremely and moreover have a slight blue-tinged coloration in order to improve the aesthetic appearance of the glass. The transparent effect is manifested as high light transmission. In order to obtain the blue-tinged color, it is known from the prior art to increase the redox of the glass, i.e. increase the content of ferrous ions $Fe^{2+}$. However, increasing the redox unfortunately results in a decrease in energy transmission and light transmission of the glass.

The blue-tinged coloration may also be obtained by adding colorants to the glass, such as cobalt, neodymium oxide and copper, enabling this blue-tinged coloration to be obtained, but their incorporation in the glass has, as a direct consequence, a decrease in energy transmission of the glass. This is illustrated for example in application EP1477 464A1. In this case, obtaining the blue-tinged color is aggravated by an amber coloration of the tin face. It is then necessary to add colorants and decrease $SO_3$ considerably in order to limit the impact of the tin face. A secondary consequence of this is to increase the redox. Although this is favorable to the desired blue-tinged color, it is unfortunately once again in conflict with obtaining high light transmission or energy transmission (low redox).

In the glass industry, the transition between manufacture of an "extraclear" solar glass intended notably for the manufacture of photovoltaic panels or solar mirrors and the manufacture of a so-called "extraclear" architectural glass represents a high cost. In fact, passage from an "extraclear" solar glass to a so-called extraclear architectural glass requires a period of transition during which the glass does not meet the quality requirements required for an "extraclear" solar glass (high energy transmission), nor does it meet those of an architectural glass (LT and blue-tinged color). This so-called "transitional" glass is unfortunately unusable and therefore represents a financial loss for the glassmakers.

Thus, there is also a need to find a solution for reducing the period of transition from production of an "extraclear" glass for solar application to production of an "extraclear" glass for architectural application.

3. AIMS OF THE INVENTION

The invention notably has the aim of overcoming these drawbacks of the prior art.

More precisely, one aim of the invention, in at least one of its embodiments, is to supply a sheet of glass with high energy transmission.

Another aim of the invention, in at least one of its embodiments, is to supply a sheet of glass with high energy transmission through oxidation of the glass by means of copper.

Another aim of the invention, in at least one of its embodiments, is to supply a sheet of glass of blue-tinged color with high light transmission.

Another aim of the invention, in at least one of its embodiments, is to supply a means that allows very rapid transition from production of an "extraclear" glass for solar application to an "extraclear" glass for architectural application.

Another aim of the invention is to supply a solution to the disadvantages of the prior art that is simple and economical.

4. DISCLOSURE OF THE INVENTION

According to a particular embodiment, the invention relates to a sheet of glass having a composition that comprises, in contents expressed as percentages of the total weight of glass:

| | |
|---|---|
| $SiO_2$ | 60-78% |
| $Al_2O_3$ | 0-10% |
| $B_2O_3$ | 0-5% |
| CaO | 0-15% |
| MgO | 0-10% |
| $Na_2O$ | 5-20% |
| $K_2O$ | 0-10% |
| BaO | 0-5% |
| Total iron (expressed in the form of $Fe_2O_3$) | 0.002-0.03%. |

According to the invention, such a composition comprises a copper content between 0.001 and 0.15%, the copper content being expressed in the form of Cu as percentage by weight relative to the total weight of the glass.

Thus, the invention is based on an approach that is altogether novel and inventive as it offers solutions to the drawbacks of the prior art and allows the technical problem to be solved. The inventors have in fact demonstrated, surprisingly, that during the manufacture of sheet glass with high energy transmission and in particular of extraclear sheet glass, it is possible to obtain the oxidizing effect of copper while controlling the coloration that it may cause. Thus, the inventors discovered that a copper content from 0.001 to 0.15 wt % relative to the total weight of the glass, combined with the other criteria of composition of the glass defined above, made it possible to lower the redox of the glass and therefore increase the energy transmission. The inventors also discovered that a copper content from 0.001 to 0.15 wt % relative to the total weight of the glass, combined with the other criteria of composition of the glass defined above, made it possible to reduce, or even eliminate the period of transition from the manufacture of an "extraclear" solar glass to the manufacture of an "extraclear" architectural glass, while guaranteeing the manufacture of "extraclear" sheet glass having high energy transmission and high light transmission. This is all the more surprising since copper is used in the glass industry as a coloring agent. According to a particular embodiment of the invention, the composition comprises a copper content from 0.001 to 0.05%.

Preferably, the composition according to the invention comprises a copper content from 0.001 to 0.04 wt % relative to the total weight of the glass. The inventors have thus demonstrated that a copper content from 0.001 to 0.04 wt % relative to the total weight of the glass made it possible to obtain oxidizing power of copper while limiting the coloring power. Preferably, the composition according to the invention comprises a copper content from 0.001 to 0.03% and even more preferably from 0.003 to 0.04 wt % relative to the total weight of the glass. In fact, the inventors demonstrated that this preferred copper content provided the highest overall gain in energy transmission. Owing to this copper content, the increase in transmission due to the oxidizing power of copper is greater than the loss of transmission due to the phenomenon of coloration. Moreover, they discovered that this copper content produces a sheet of glass displaying significant stability of energy transmission over time.

The inventors also discovered that a copper content from 0.01 to 0.15 wt % relative to the total weight of the glass made it possible to obtain the blue-tinged coloration that is desirable for glass intended for architectural application while preserving high light transmission. Preferably, a sheet of glass with high light transmission and colored blue is obtained owing to a composition according to the invention comprising a copper content from 0.01 to 0.08 wt % relative to the total weight of the glass. More preferably, a sheet of glass with high light transmission and colored blue is obtained owing to a composition according to the invention comprising a copper content from 0.012 to 0.05 wt % relative to the total weight of the glass.

The glass displays an optimum of ET which is the compromise between the gain due to the large decrease in redox and the increasingly intense coloration due to the addition of copper. In fact, coloration by copper depends on its oxidation level; $Cu^{2+}$ is extremely coloring whereas $Cu^+$ absorbs very little and has a colorless rendition. In a first step, the reaction $Cu^{2+}+Fe^{2+}\rightarrow Cu^++Fe^{3+}$ is almost complete. The oxidizing effect is therefore predominant as $Cu^+$ is colorless. The gain in transmission is therefore related entirely to the gain in redox. Starting from a certain $Cu/Fe_2O_3$ ratio, the reaction is no longer complete and the excess copper is present in the glass in the form of $Cu^{2+}$. The coloration therefore begins to appear, even if the redox remains low. We then have a gradual decrease in transmission, which coincides with a more and more pronounced blue-tinged coloration. The optimal $Cu/Fe_2O_3$ ratio depends on the thermal and chemical history of the glass. For example, a hotter production furnace, and a longer residence time in the furnace will affect the thermal history and therefore the position of this optimum and of the equilibrium that governs the appearance of $Cu^{2+}$. Moreover, to respect stoichiometry, a larger amount of iron (mid-iron) in the glass means having to use more copper to lower the redox to the same extent as for glass that is extraclear and therefore has a low iron content (low-iron). The amount of copper necessary for attaining optimal transmission and for causing $Cu^{2+}$ to appear is therefore greater when the level of iron increases.

Moreover, the inventors discovered that owing to the overlap of these 2 ranges of copper contents, namely copper contents from 0.001 to 0.05% and 0.01 to 0.15% (oxidizing power versus coloring power of the copper), it was possible to meet the requirements specified both for glass for solar application and for glass for architectural application. Thus, the period of transition from the manufacture of an "extraclear" solar glass to the manufacture of an "extraclear" architectural glass is greatly reduced, or even eliminated since the same compound, namely copper, is used both for oxidizing and for coloring the glass.

An excessive effect of coloration of the glass by copper is of course problematic in the case of "extraclear" glass (low iron content) used for solar applications since it decreases the energy transmission. Moreover, it is also well known from the prior art that copper colors glass, and therefore affects the energy transmission of the glass, a crucially important parameter for so-called "extraclear" glass used for solar applications. Application WO 2010/134796 shows for example that addition of copper to a glass composition leads to a decrease in ET and in LT without affecting the redox and while coloring the glass. Owing to this phenomenon of coloration, copper therefore did not constitute, according to the prior art, a suitable element for adding to a composition of "extraclear" solar glass intended notably for the manufacture of photovoltaic panels or solar mirrors.

Throughout the present text, when a range is stated, the limits are included. Moreover, all the integral values and sub-domains in the numerical range are expressly included as if explicitly written. Also throughout the present text, the values of content as percentages are values by weight, expressed as percentage relative to the total weight of the glass.

Other features and advantages of the invention will become clearer on reading the following description and the figures, given as examples for purposes of illustration and nonlimiting, where.

According to the invention, the composition has a redox below 0.3. This redox range makes it possible to obtain optical properties that are very satisfactory, especially in terms of energy transmission. Preferably, the composition has a redox below 0.25. Quite preferably, the composition has a redox below 0.20.

According to the invention, the composition comprises a total iron content (expressed in the form of $Fe_2O_3$) in the range from 0.002 to 0.03 wt % relative to the total weight of the glass. This maximum value of total iron content makes it possible to increase the energy transmission of the sheet of glass significantly relative to a clear glass. The minimum value makes it possible to avoid a disadvantageous effect on the cost of the glass, as such low values often require expensive, very pure raw materials or else purification of the latter. Preferably, the composition comprises a total iron content (expressed in the form of $Fe_2O_3$) in the range from 0.002 to 0.02 wt % relative to the total weight of the glass. A total iron content (expressed in the form of $Fe_2O_3$) less than or equal to 0.02% by weight allows a further increase in energy transmission of the sheet of glass. More preferably, the composition comprises a total iron content (expressed in the form of $Fe_2O_3$) in the range from 0.005 to 0.02 wt % relative to the total weight of the glass.

According to the invention, the composition of the sheet of glass may comprise, in addition to the impurities contained notably in the raw materials, a small proportion of additives (such as glass melting or refining aids) or of elements derived from dissolution of the refractories for the melting furnaces.

To avoid the phenomenon of solarization, and according to a preferred embodiment, the composition of the sheet of glass comprises a cerium content (expressed in the form of $CeO_2$) less than or equal to 0.02 wt % relative to the total weight of the glass. Preferably, the composition of the sheet of glass comprises a cerium content (expressed in the form of $CeO_2$) less than or equal to 0.01 wt % relative to the total weight of the glass. More preferably, the composition of the sheet of glass comprises a cerium content (expressed in the form of $CeO_2$) less than or equal to 0.005 wt % relative to the total weight of the glass. Even more preferably, the composition of the sheet of glass is free from cerium.

According to another preferred embodiment, the composition of the sheet of glass comprises a vanadium content (expressed in the form of $V_2O_5$) less than or equal to 0.01 wt % relative to the total weight of the glass. Preferably, the composition of the sheet of glass comprises a vanadium content (expressed in the form of $V_2O_5$) less than or equal to 0.005 wt % relative to the total weight of the glass. Even more preferably, the composition of the sheet of glass is free from vanadium.

According to yet another preferred embodiment, the composition comprises a vanadium content (expressed in the form of $V_2O_5$) less than or equal to 0.01 wt % relative to the total weight of the glass and a cerium content (expressed in the form of $CeO_2$) less than or equal to 0.02 wt % relative to the total weight of the glass. Preferably, the composition comprises a vanadium content (expressed in the form of $V_2O_5$) less than or equal to 0.005 wt % relative to the total weight of the glass and a cerium content (expressed in the form of $CeO_2$) less than or equal to 0.01 wt % relative to the total weight of the glass. Quite preferably, the composition comprises a vanadium content (expressed in the form of $V_2O_5$) less than or equal to 0.005% by weight relative to the total weight of glass and a cerium content (expressed in the form of $CeO_2$) less than or equal to 0.005% by weight relative to the total weight of the glass. Even more preferably, the composition is free from vanadium and cerium.

According to yet another preferred embodiment, the composition of the sheet of glass comprises an antimony content (expressed in the form of $Sb_2O_3$) below 0.2 wt % relative to the total weight of the glass. Preferably, the composition of the sheet of glass comprises an antimony content (expressed in the form of $Sb_2O_3$) less than or equal to 0.15 wt % relative to the total weight of the glass. More preferably, the composition of the sheet of glass is free from antimony.

According to yet another preferred embodiment, the composition of the sheet of glass comprises an arsenic content (expressed in the form of $As_2O_3$) below 0.01 wt % relative to the total weight of the glass. Preferably, the composition of the sheet of glass is free from arsenic.

According to yet another preferred embodiment, the composition of the sheet of glass comprises a chromium content (expressed in the form of $Cr_2O_3$) below 0.01 wt % relative to the total weight of the glass.

According to yet another preferred embodiment, the composition of the sheet of glass comprises a content of $SO_3$ above 0.2 wt % relative to the total weight of the glass. This is necessary in order to:
- guarantee good refining and therefore an adequate quality of glass,
- have a sufficiently oxidizing effect of the sulfates and not generate an excessively high redox, which would be in conflict with the aim of obtaining high energy transmission and light transmission of the glass.

The sheet of glass according to the invention preferably has an energy transmission (ET), measured for a thickness of 3.85 mm, of at least 90%. Advantageously, the sheet of glass according to the invention has an energy transmission (ET), measured for a thickness of 3.85 mm, of at least 90.4%, and preferably of at least 90.8%.

The sheet of glass according to the invention preferably has a light transmission, measured with the illuminant D65 (LTD), according to standard ISO9050 and for a thickness of 4 mm, of at least 90.3%. Advantageously, the sheet of glass according to the invention has a light transmission (LT), measured for a thickness of 4 mm, of at least 90.7%, and preferably of at least 91%.

The sheet of glass according to the invention preferably has a dominant wavelength, as defined above, below 510 nm. Advantageously, the sheet of glass according to the invention has a dominant wavelength (DWL) below 500 nm. This characteristic is particularly desirable for extraclear sheet glass for architectural application.

The sheet of glass according to the invention may be a sheet of glass obtained by a float process, by rolling or any other known process for manufacturing a sheet of glass starting from a composition of molten glass. According to a preferred embodiment according to the invention, the sheet of glass is a sheet of float glass. "Sheet of float glass" means a sheet of glass formed by the float process, consisting of pouring molten glass onto a bath of molten tin, in reducing conditions. A sheet of float glass comprises, as is well known, a face called "tin face", i.e. a face enriched with tin in the glass material near the surface of the sheet. Enrichment with tin means an increase in the concentration of tin relative to the composition of the glass at the center, which may or may not be substantially zero (free from tin).

Copper may be incorporated in the composition according to the invention in various forms. It may for example be CuO, $Cu_2O$, or else $CuSO_4$.

In the case of a solar photovoltaic module, the sheet of glass according to the invention preferably constitutes the protective substrate (or cover) of the photovoltaic cells.

According to one embodiment of the invention, the sheet of glass is coated with at least one thin transparent, electrically conducting layer. This embodiment is advantageous for photovoltaic applications. When the sheet of glass is used as protective substrate of a photovoltaic module, the thin transparent, conducting layer is arranged on the inner face, i.e. between the sheet of glass and the solar cells.

A thin transparent, conducting layer according to the invention may be, for example, a layer based on $SnO_2$:F, $SnO_2$:Sb or ITO (indium-tin oxide), ZnO:Al or else ZnO:Ga.

According to another advantageous embodiment of the invention, the sheet of glass is coated with at least one antireflective (or antireflection) layer. This embodiment is advantageous in the case of photovoltaic applications in order to maximize the energy transmission of the sheet of glass and, for example, thus increase the efficiency of the solar module comprising this sheet as substrate (or cover) covering photovoltaic cells. In applications in the solar energy field (photovoltaic or thermal), when the sheet of glass is used as protective substrate, the antireflective layer is arranged on the outer face, i.e. the insolation side.

An antireflective layer according to the invention may be, for example, a layer based on porous silica with low refractive index or it may consist of several layers (stack), notably a stack of layers of dielectric material alternating with layers with low and high refractive indices and ending with a layer with low refractive index.

According to one embodiment, the sheet of glass is coated with at least one thin transparent, electrically conducting layer on a first face and at least one antireflective layer on the other face.

According to yet another embodiment, the sheet of glass is coated with at least one antireflective layer on each of its faces.

According to another embodiment, the sheet of glass is coated with at least one antisoiling layer. Said antisoiling layer may be combined with a thin transparent, electrically conducting layer, deposited on the opposite face. Said antisoiling layer may also be combined with an antireflective layer deposited on the same face, the antisoiling layer being on the outside of the stack and therefore covering the antireflective layer.

According to yet another embodiment, the sheet of glass is coated with at least one reflective layer. Said reflective layer is for example a layer based on silver. This embodiment is advantageous in the case of applications for solar mirrors (flat or parabolic).

Depending on the applications and/or the desired properties, other layers may be deposited on one and/or the other face of the sheet of glass according to the invention.

The sheet of glass according to the invention may be incorporated in a multiple glazing unit (notably double or triple). Multiple glazing unit means a glazing unit that comprises at least two sheets of glass providing a space filled with gas or under vacuum between each pair of sheets. The sheet of glass according to the invention may also be laminated and/or tempered and/or hardened and/or curved.

The invention also relates to a solar photovoltaic module or a mirror for concentration of solar energy, comprising at least one sheet of glass according to the invention.

The invention also relates to all architectural applications: facades, window breasts, double or triple glazing. It will also be used as glass substrate for paints when the rendition of the paint cannot be affected by the glass (ovens, smartphones, etc.) or all applications where the aesthetic rendition is important. The invention will also have applications in the artistic field (sculpture, framing, etc.). The automobile sector may also benefit from this invention.

The examples that follow illustrate the invention, without intending to limit its scope in any way.

EXAMPLES

The following examples are intended to show the effect of the copper content on the energy transmission obtained, the light transmission obtained, the color of the glass and the redox for a certain copper content expressed as a percentage relative to the total weight of the glass.

The raw materials were mixed in the form of powder and were put in a crucible for melting, according to the composition (total iron=100 ppm) shown below. The copper was incorporated in the form of CuO. For all the glasses tested, the contents of the components were kept fixed apart from the amount of copper. The copper content (expressed in Cu) expressed as a percentage relative to the total weight of the glass is then variable from one glass sample to another.

| Composition | Content [wt %] |
|---|---|
| CaO | 9 |
| $K_2O$ | 0.015 |
| $Na_2O$ | 14 |
| $SO_3$ | 0.3 |
| $TiO_2$ | 0.015 |
| $Al_2O_3$ | 0.7 |
| MgO | 4.5 |
| Copper (expressed in Cu) | Variable (from ~0 to 0.035%) |
| Total iron (expressed in $Fe_2O_3$) | 0.01 |

After melting, the optical properties of each sample of glass in the form of sheet were determined and, in particular, the energy transmission (ET) was measured according to standard ISO9050 for a thickness of 3.85 mm. The values of ET were determined in order to check whether the gain in energy transmission due to the oxidizing effect of the copper is greater than the loss in transmission due to the coloration caused by said copper.

Figure 1:
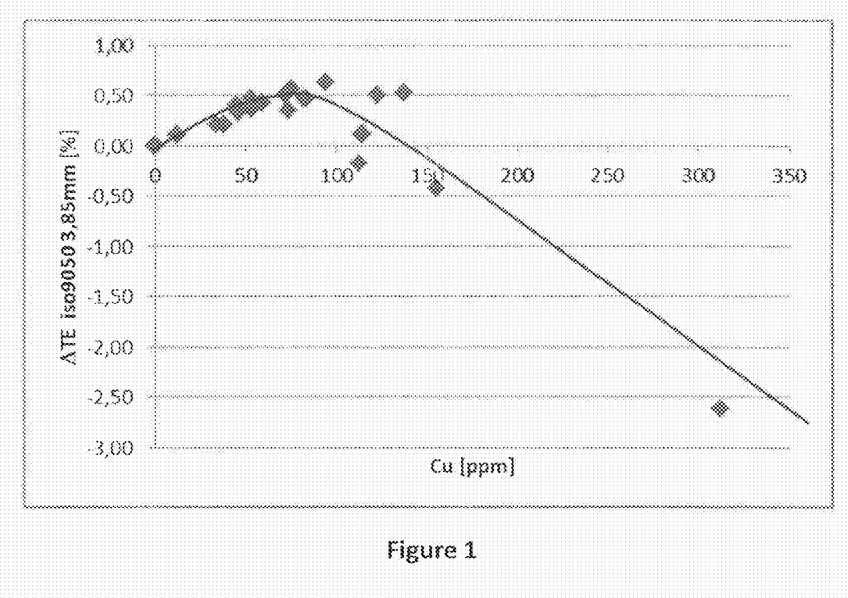
FIG. 1 shows the effect of the copper content on the energy transmission of sheets of glass according to the invention.

FIG. 1 shows the effect of the copper content on the ET of sheets of glass according to the invention. A positive ΔTE then corresponds to a gain in energy transmission relative to a usual extraclear glass and a negative ΔTE corresponds to a loss of energy transmission. According to the invention, copper added to the composition will react with the ferrous ions according to the following reaction:

$$Fe^{2+}+Cu^{2+}\rightarrow Fe^{3+}+Cu^{+}$$

FIG. 1 shows that firstly, the energy transmission increases with the copper content. This effect is notably due to the decrease in the redox. The absorption caused by $Cu^+$ is then negligible or even zero, and so has no effect on transmission or on the color of the glass. Then the amount of copper becomes too great relative to the amount of iron. This therefore leads to formation of $Cu^{2+}$ in excess since the latter no longer reacts with the $Fe^{2+}$. This species ($Cu^{2+}$) absorbs in the visible range and endows the glass with a blue-tinged coloration. Thus, the more the copper content is increased, the more the effect of $Cu^{2+}$ is accentuated, which has as a consequence a gradual decrease in energy transmission.

Figure 2:
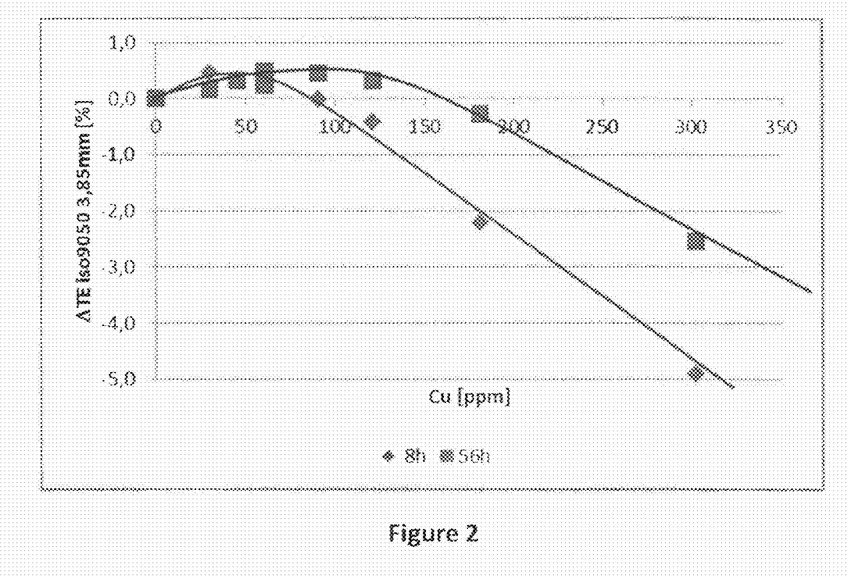
FIG. 2 shows the effect of the copper content and residence time in a furnace on the energy transmission of sheets of glass according to the invention.

The effects of the copper content and of the residence time in a furnace, also called the "thermal history", on the ET of sheets of glass according to the invention were also evaluated. The results obtained are illustrated in FIG. 2. This figure shows that an optimum of energy transmission is obtained for different values of copper depending on the thermal history of the glass. The thermal history will in fact have an effect on the following reaction: $Fe^{2+}+Cu^{2+}\rightarrow Fe^{3+}+Cu^{+}$ within the glass and thus displace the equilibrium, starting from which the formation of $Cu^{2+}$ appears. FIG. 2 also shows that the reduced form $Cu^+$ is favored when the thermal history is longer, thus delaying the appearance of the coloration and allowing extension of the range over which the oxidizing power of the copper is greater than its coloring power with respect to the ET. Finally, FIG. 2 shows that the longer the thermal history, the more the copper content to be added to the composition in order to reach optimal transmission is increased. The results illustrated in FIG. 2 were obtained from sheets of glass obtained in the laboratory, but the thermal history of 56 h approaches industrial conditions. Thus, it is understood that the copper content that has to be added to the composition in order to obtain such values of ET from sheets of glass produced industrially may be above 0.05%. It is thus considered that at most three times more copper will be necessary in the composition to obtain these optimal values of ET industrially (data not shown). It is similarly understood that the form of the melting furnace and the thermal history may affect the copper content that must be added to the composition in order to obtain a sheet of glass according to the invention.

Figure 3:
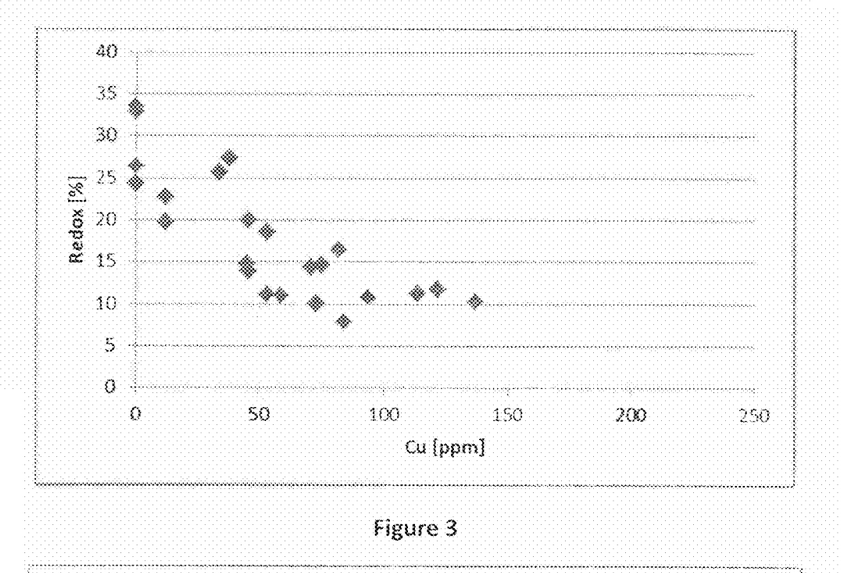
FIG. 3 shows the effect of the copper content on the redox of the sheets of glass according to the invention.

The effect of the copper content on the redox of the sheets of glass according to the invention was also measured, and is illustrated in FIG. 3. Thus, FIG. 3 shows that the higher the copper content, the lower the redox of the glass. This decrease in the redox of the glass is notably due to oxidation of the iron by the copper.

Figure 4:
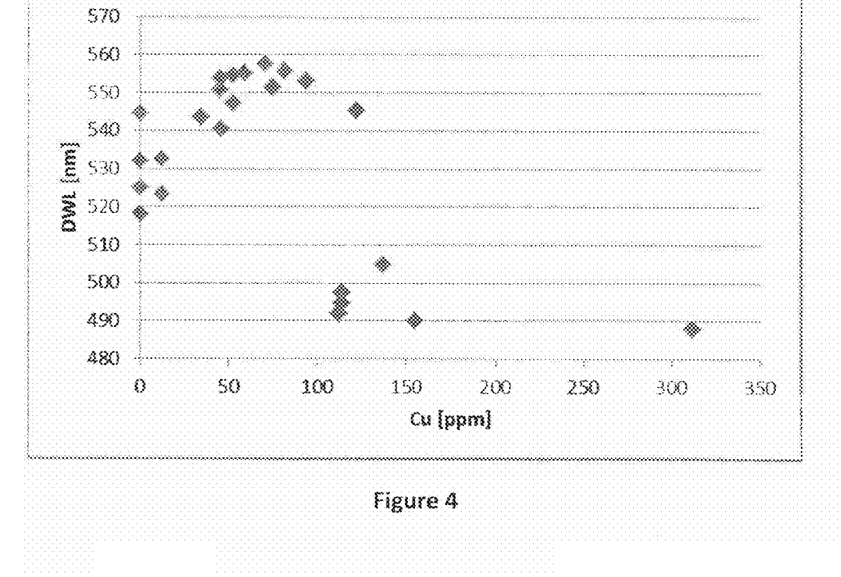
FIG. 4 shows the effect of the copper content on the color of the sheets of glass according to the invention.

The copper content also has an effect on the color of the sheets of glass according to the invention. This effect is illustrated for example in FIG. 4. The inventors have shown that with increase in copper content, there is firstly a phase where the main effect of Cu is oxidation of the glass, since oxidation of iron leads to an increase in the dominant wavelength of the glass relative to its initial state, as glass yellows following decrease in the amount of $Fe^{2+}$. The more the copper content is increased, the more the $Cu/Fe_2O_3$ ratio increases. Beyond a certain value (depending on the thermal and chemical history of the glass, as well as its level of iron), $Cu^{2+}$ appears in the glass which has, as a direct consequence, a (blue-tinged) coloration of the glass. Thus, the dominant wavelength (DWL) is reduced or even reduced below its reference level (without copper) indicating that the blue-tinged coloration brought about by the $Cu^{2+}$ is sufficiently high to compensate the yellow coloration due to the strong oxidation of the glass. In the field of extraclear glasses for so-called architectural applications, a slight blue-tinged coloration is highly desirable. This is reflected notably in a dominant wavelength below 510 nm, and even more preferably below 500 nm.

Figure 5:
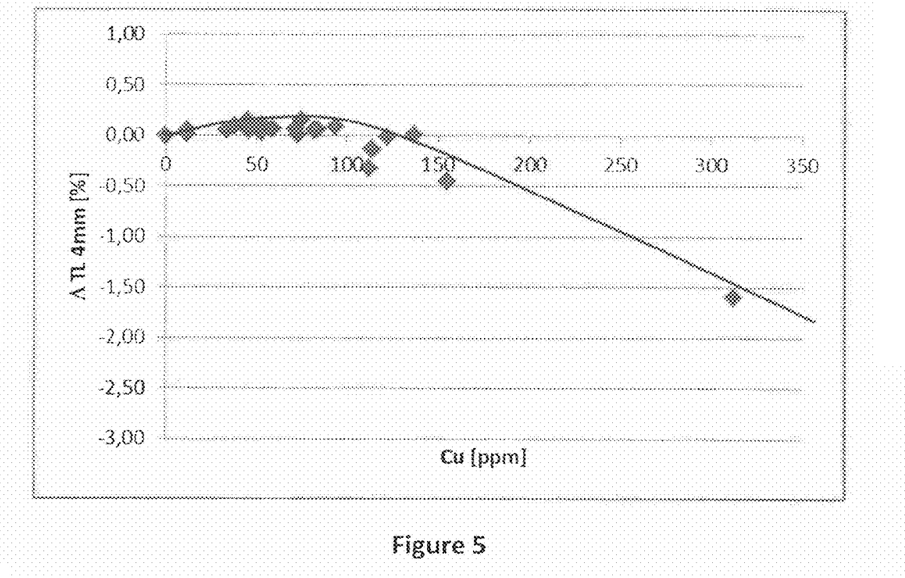
FIG. 5 shows the effect of the copper content on the light transmission of the glass.

The values of LT for a thickness of 4 mm were also evaluated for these same sheets of glass. Thus, FIG. 5 shows the effect of the copper content on the light transmission of the glass. Similarly to ET, the latter increases firstly with addition of copper before decreasing following coloration of the glass. A very desirable point in the production of "extraclear" glass for architectural application is high light transmission and a slight blue-tinged appearance. However, to obtain this blue-tinged appearance, the colorants used will absorb in the visible range, which will lead to a decrease in light transmission. Copper makes it possible, even in its range of coloring effect, namely 0.01 to 0.15 wt % relative to the total weight of the glass, to maintain a higher light transmission at similar color rendering. In fact, in parallel with its coloring action, the copper oxidizes the iron, and thus raises the baseline level of light transmission before absorbing light.

Figure 6:
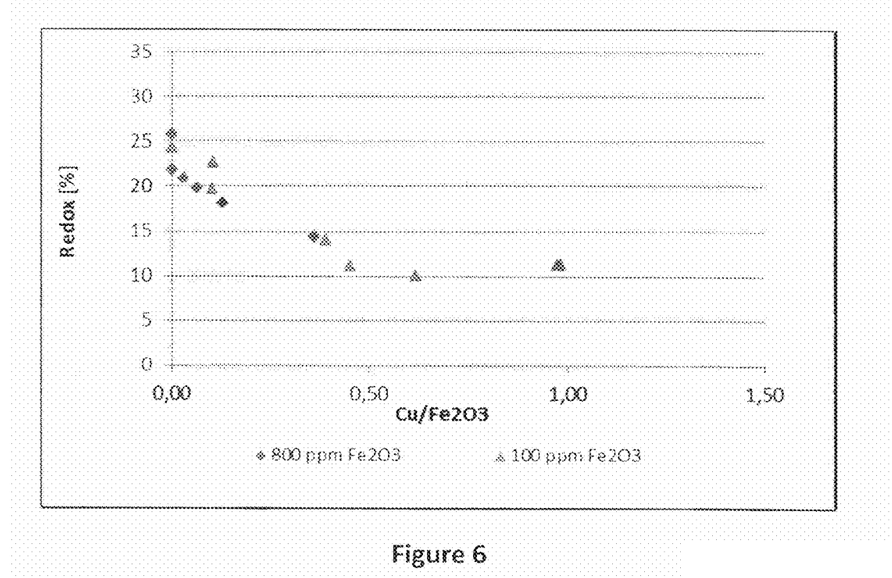
FIG. 6 shows the effect of the copper content relative to the iron content on the redox of the glass.

Finally, FIG. 6 shows the effect of the copper content and iron content on the redox. Thus, 2 iron contents were tested, namely 100 and 800 ppm (extraclear glass and clear glass). In fact, the higher the iron content of the glass, the larger the amount of copper required to obtain the same decrease in redox. Similarly, the amount starting from which $Cu^{2+}$ will appear for coloration is dependent on the amount of iron present in the glass since it depends on, among other things, the equation $Cu^{2+}+Fe^{2+} \rightarrow Cu^{+}+Fe^{3+}$. It is thus proved that for a mid-iron glass (for example a glass containing 300 ppm of iron), more copper will be required than in a low-iron glass (three times more in the context of this example if compared with a low-iron glass containing 100 ppm of iron) to obtain the same effects on the redox and reach the amount of copper at which appearance of $Cu^{2+}$ and coloration begin. Copper therefore makes it possible to obtain sheets of glass with energy transmission equivalent to the previous performance, at lower cost. Copper therefore also makes it possible to obtain sheets of glass with light transmission equivalent to that obtained with other colorants, also at lower cost. Thus, the oxidizing effect of copper, improving the energy transmission and the light transmission of the sheet of glass, would make it possible to work with raw materials that are less pure and less expensive to obtain the same optical properties of transmission.

The invention claimed is:

1. A sheet of glass having a composition that comprises, in contents expressed as percentages of total weight of glass:

| | |
|---|---|
| $SiO_2$ | 60-78% |
| $Al_2O_3$ | 0-10% |
| $B_2O_3$ | 0-5% |
| CaO | 0-15% |
| MgO | 0-10% |
| $Na_2O$ | 5-20% |
| $K_2O$ | 0-10% |
| BaO | 0-5% |
| Total iron (expressed in the form of $Fe_2O_3$) | 0.002-0.03%, | wherein the composition further comprises a copper content from 0.001 to 0.15% by weight relative to the total weight of the glass, the copper content being expressed in the form of Cu as percentage by weight relative to the total weight of the glass, and wherein a ratio of Cu/Total iron is such that the sheet of glass exhibits an increase in energy transmission ($\Delta ET$) of at least 0.1% relative to an otherwise identical sheet of glass having no copper.

2. The sheet of glass according to claim 1, wherein the composition comprises a total iron content (expressed in the form of $Fe_2O_3$) from 0.002 to 0.02 wt % relative to the total weight of the glass.

3. The sheet of glass according to claim 1, wherein the composition comprises a copper content (expressed in the form of Cu) from 0.001 to 0.04 wt % relative to the total weight of the glass.

4. The sheet of glass according to claim 3, wherein the composition comprises a copper content (expressed in the form of Cu) from 0.003 to 0.04 wt % relative to the total weight of the glass.

5. The sheet of glass according to claim 1, wherein it has an energy transmission, measured for a thickness of 3.85 mm, of at least 90%.

6. The sheet of glass according to claim 1, wherein the composition comprises a copper content (expressed in the form of Cu) from 0.012 to 0.05 wt % relative to the total weight of the glass.

7. The sheet of glass according to claim 1, wherein it has a light transmission, measured for a thickness of 4 mm, of at least 90.3%.

8. The sheet of glass according to claim 1, wherein it has a dominant wavelength below 510 nm.

9. The sheet of glass according to claim 1, wherein the composition has a redox below 0.3.

10. The sheet of glass according to claim 1, wherein the composition further comprises a content of $SO_3$ above 0.2 wt % relative to the total weight of the glass.

11. The sheet of glass according to claim 1, wherein it is coated with at least one thin transparent and electrically conducting layer.

12. The sheet of glass according to claim 11, wherein the thin transparent and electrically conducting layer comprises $SnO_2$:F, $SnO_2$:Sb, ITO (indium-tin oxide), ZnO:Al and/or ZnO:Ga.

13. The sheet of glass according to claim 11, wherein the thin transparent and electrically conducting layer is on one or both sides of the sheet of glass, and the thin transparent and electrically conducting layer is on one or both sides of the sheet of glass, and the thin transparent and electrically conducting layer is one or more selected from an antireflective layer, and an antisoiling layer.

14. A solar photovoltaic module or mirror comprising at least one sheet of glass according to claim 1, wherein the mirror, if present, is a solar mirror.

* * * * *